United States Patent
Kia et al.

(10) Patent No.: US 9,688,032 B2
(45) Date of Patent: Jun. 27, 2017

(54) THERMOPLASTIC COMPONENT REPAIR

(71) Applicant: GM GLOBAL TECHNOLOGY OPERATIONS LLC, Detroit, MI (US)

(72) Inventors: Hamid G. Kia, Bloomfield Hills, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1022 days.

(21) Appl. No.: 13/932,071

(22) Filed: Jul. 1, 2013

(65) Prior Publication Data
US 2015/0001768 A1    Jan. 1, 2015

(51) Int. Cl.
| | | |
|---|---|---|
| *B29C 33/32* | (2006.01) | |
| *B29C 73/30* | (2006.01) | |
| *B29C 73/34* | (2006.01) | |
| *B29C 35/04* | (2006.01) | |
| *B29C 35/02* | (2006.01) | |
| *B29C 35/08* | (2006.01) | |

(52) U.S. Cl.
CPC ............ *B29C 73/30* (2013.01); *B29C 35/041* (2013.01); *B29C 73/34* (2013.01); *B29C 2035/0211* (2013.01); *B29C 2035/0811* (2013.01); *B29C 2035/0816* (2013.01); *B29K 2995/0008* (2013.01)

(58) Field of Classification Search
CPC ......... B29C 33/02; B29C 73/00; B29C 73/30; B29C 73/343
USPC ....................................................... 264/36.1
See application file for complete search history.

(56) References Cited

U.S. PATENT DOCUMENTS

| | | | |
|---|---|---|---|
| 3,865,662 A | | 2/1975 | Segal |
| 4,592,225 A | * | 6/1986 | Eck .......................... B21D 1/14 187/211 |
| 4,754,637 A | | 7/1988 | O'Dell |
| 2004/0129924 A1 | | 7/2004 | Stark |
| 2008/0128078 A1 | | 6/2008 | May et al. |
| 2009/0127253 A1 | | 5/2009 | Stark et al. |

FOREIGN PATENT DOCUMENTS

| | | |
|---|---|---|
| DE | 881710 C | 7/1953 |
| DE | 2823585 A1 | 12/1978 |
| DE | 3875905 T2 | 4/1993 |
| DE | 60122188 T2 | 7/2007 |

(Continued)

OTHER PUBLICATIONS

Roger Vodicka; Thermoplastics for Airframe Applications a Review of the Properties and Repair Methods for Thermoplastic Composites; DSTO Aeronautical and Maritime Research Laboratory, Melbourne Victoria; AR No. AR 009-900; Oct. 1996.

*Primary Examiner* — Christina Johnson
*Assistant Examiner* — Xue Liu
(74) *Attorney, Agent, or Firm* — Reising Ethington P.C.

(57) ABSTRACT

Thermoplastic components may experience local damage, including cracks and decohesion of fiber reinforcements, among others. Such thermoplastics may be repaired by heating them to a suitable softening/melting temperature under pressure and maintaining them under pressure and at elevated temperature until the damage is healed. This may be done in-place using custom-fabricated, suitably-shaped die portions maintained under pressure by magnetic attraction. Various heating methods and die portion fabrication methods are described.

20 Claims, 5 Drawing Sheets

(56) References Cited

FOREIGN PATENT DOCUMENTS

| GB | 571598 A | 8/1945 |
| GB | 857859 | 1/1961 |
| GB | 975114 | 11/1964 |

* cited by examiner

THERMOPLASTIC COMPONENT REPAIR

TECHNICAL FIELD

This invention pertains to methods of repairing thermoplastic parts and components, optionally containing fillers or reinforcements, particularly in-place repair after their assembly into a vehicle, device or machine.

BACKGROUND OF THE INVENTION

In automotive body construction there is an increasing trend to use lightweight materials, or materials which offer higher structural performance per unit mass than low carbon or 'mild' steel, historically the material of choice for automobile bodies. A broad range of light-weight materials is currently in use including high strength steel, alloys of metals with lower density than steel, for example aluminum and magnesium, and polymers and polymer composites.

The initial use of polymers and polymer composites employed thermosetting polymers but, increasingly, attention is being focused on thermoplastic polymers which are beginning to supplant some of the earlier-adopted, alternative materials used in automobile bodies. Such thermoplastic polymers are meltable and heat formable and so may be shaped into a wide range of forms by application of heat and pressure. Suitably the thermoplastic may be shaped by being confined within an appropriately-shaped die cavity positioned internally to a heated, multipart die body and subjected to a shaping force applied to the die body by a press or similar machine.

All body components may be damaged in service, for example through forces generated by encounters with rough roads, potholes etc. during otherwise normal operation or under violent impacts such as may be encountered during collision. Where possible, it is desirable to repair any such damaged components. Preferably such repair may be performed in-place to limit the need for vehicle disassembly.

SUMMARY OF THE INVENTION

Thermoplastic components are widely used in many articles of manufacture, including automobiles. Commonly such components are a part of an assembly, operationally attached to neighboring components so that the components may cooperate to impart some performance attribute to the assembly. Repair of such thermoplastic components will be facilitated if such repair may be conducted in-place without need for extensive disassembly.

Such a repair process is comprehended by the instant invention. Die portions corresponding to the undamaged shape of the component are placed over the damaged area or zone and held in place by an applied pressure resulting from the attraction of a magnet or electromagnet and a target. The target may be a second magnet/electromagnet or a ferromagnetic body. Sufficient pressure is applied to generally re-shape the damaged area to its undamaged shape. While still under pressure the damage zone is heated to a temperature sufficient to flow or melt the thermoplastic and the pressure and heat continue to be applied until all damage is healed, whereupon the heating may be discontinued and, after the part has cooled, the pressure released.

Thermoplastic structural and appearance parts, often based on nylons, polyolefins, polyacrylates, polycarbonates, and polyesters, and frequently fiber reinforced, especially with carbon fiber, are being increasingly used in automobiles. Typically such parts may be substantially two-dimensional, extending for some tens or hundreds of millimeters laterally but with thicknesses ranging from only about 1.5 millimeters to about 6 millimeters or so. Examples include instrument panels, mirror housings, light housings and front end modules among others Such parts may sustain damage in manufacture, during installation or assembly into a vehicle, device or machine, or when placed in service. Often, such damage will be of limited extent and confined to only some region of the component. This invention provides a method for repair of such damaged thermoplastic parts. The method may be practiced with the component removed from the vehicle device or machine or in-place, thereby eliminating or minimizing any need for disassembly to remove the damaged component prior to repair.

In practice of the invention, shaped die portions with opposed forming surfaces complementary to the surface of the undamaged part are placed on the surfaces of the damaged component at the damage site. The die portions will typically be thin shells which encompass, but extend beyond, the damage zone so that the outermost contact region of the die surfaces is supported on an undamaged portion of the part or component. Such support will ensure that the die portions are appropriately spaced apart in the repair region to maintain, in the repaired portion of the component, the original component thickness. Suitably the linear extent of the die portion may be between about 110% and 150% of the similarly-oriented linear extent of the damaged zone, that is the linear dimensions of the die portion are determined by scaling the linear dimensions of the damage zone. The die portions are forcibly urged toward one another under the attractive force generated by a magnetic system which comprises two magnetic elements which may include magnets, electromagnets and/or ferromagnetic bodies selected and cooperatively arranged to exert a mutually attractive force between them. Most commonly the magnetic system is separate from the die portions and mounted externally to the die portions, but in some embodiments one of the die portions may be a ferromagnetic body so that it may also serve as an element of the magnetic system. The magnetic force is selected so that the die portions apply a confining pressure of between about 7 and 700 kPa (kilopascals) to the part, the range being primarily attributable to the sharpness of the feature to be formed and the viscosity of the thermoplastic at its repair temperature. Because the extent of damage may vary from component to component and from vehicle to vehicle, it may be preferred to use electromagnets so that the required pressure may be suitably adjusted, by control of the electric current supplied to the electromagnets, for each repair incident. Where electromagnets are used, the confining pressure may be incremented gradually, or in a step-wise fashion, by suitably programming the current applied to the electromagnet.

For most thermoplastics the die portions may be applied and clamped with the component at ambient temperature without risk of further damaging the component. For other, more brittle thermoplastics, it may be beneficial to pre-heat the damage zone, using hot air guns or radiant heaters, prior to application of the die portions. Such a procedure may also offer benefit in expediting the repair process. Once the die portions are in place, the part is locally heated, at the damage zone, to a temperature sufficient to reflow and, if necessary, melt, the thermoplastic.

Typically suitable repair temperatures for thermoplastics employed in automobiles and light duty trucks may vary significantly. Suitable temperatures may be 150-210° C. for thermoplastic Nylon (polyamide), 100-170° C. for thermoplastic polyolefin and 220-280° C. for thermoplastic polyesters. Heating will be confined to the damaged region so that only the damaged region experiences a sufficiently elevated temperature to soften and/or melt the component. The die portions extend beyond the damaged portion and because only the damaged portion is heated to a melting or reflow temperature, the softened or melted portion will be confined on its faces by the contacting, pressurized die portions and on its periphery by the undamaged, cooler, stronger portion of the component. Thus no loss of the thermoplastic due to expulsion during repair may occur. The reflow or melting process will serve to fuse together the surfaces of any defects, for example opposing crack surfaces, in the damage zone together, so that the damage to the thermoplastic may be undone. The part may then be cooled, maintaining the die portions in place and under pressure until the part temperature is reduced below the melting point of the thermoplastic, at which temperature the die shell portions may be removed. Thus, the part may be reshaped and substantially restored to its original form, appearance and functionality.

Either natural or forced cooling may be used. Forced cooling may be promoted most simply by directing a flow of cooling air over the die portions. Alternately cooling passages may be formed in the die portion or a suitably shaped cooling coil, adapted for passage of a cooling fluid may be affixed to the opposing, non part-contacting die portion surface. Any suitable coolant may be used. Most commonly, this may be water from a municipal or private water system, but where liquid heating of the die portion(s) is used, the cooling fluid should be selected for compatibility with the heating fluid so that the same die portion passages may be used for both heating and cooling. Where a suitable operating temperature is less than 200° C. or so, high temperature thermoelectric devices may also be used for cooling.

Such a procedure is suited for repairs where no loss of material has occurred, such as where the component has cracked or delaminated. Where the damage has resulted in loss of material, for example where the part may be holed, additional material may be provided prior to initiating the repair process. The material may be unconsolidated and in the form of granules, pellets or other suitable form or consolidated into a generally planar patch. It is expected that the composition and structure of the added material will generally mimic the structure of the thermoplastic part, so that, for example, an unfilled thermoplastic will be used for an unfilled thermoplastic component and a filled and/or reinforced material will be used for filled and/or reinforced thermoplastic components. However, the concentration of filler, or, more particularly, reinforcement, may be adjusted, if required, to enhance the properties of the component at the repair site.

Preparation of the damaged area prior to repair need not be extensive and may be limited to removal of any oil or similar hydrocarbons prior to repair. Generally some small concentration of particulate debris, 'dirt', may be accommodated within the thermoplastic where it will behave as inert filler and minimally affect post-repair component performance. Where the part is to be washed or cleaned prior to repair, it should be thoroughly dried prior to repair to avoid vaporizing any remaining liquid during repair, and entraining voids in the repaired component. Where a patch is to be used, it may be preferred to cut out the damaged portion to form an opening in the component of a preferred size to enable use of a 'standard' patch of complementary shape and dimension.

The die portions will typically be thin shells, appropriately reinforced to impart suitable rigidity under the applied pressure and, in some embodiments, thermally and electrically conductive. Such a shell die portion may be prepared using physical models such as the original production mold or a suitable surrogate, such as an intact part, preferably a part validated against a master data file. The physical model can then be used to shape and support a replicate die portion or die shell portion which may be fabricated of suitably reinforced plaster or polymer or a plasma spray-deposited metal.

In many cases however, the original mold surfaces will be stored in a digital record which may serve to re-create the required portions by 3D printing or additive manufacturing processes. Suitable additive manufacturing processes for metal structures include Selective Laser Sintering (SLS) in which powders, which may be metal powders comprising copper, iron and titanium among others, are bonded together into a porous body. Higher temperatures capable of melting and fusing metal powders may be achieved with electron beam melting (EBM) in which the powder layers are melted to form fully dense, void-free bodies. Non-metallic, for example ceramic- and polymer-based, additively-manufactured mold portions may also be used provided they will remain stable under the applied pressure and molding temperature required of the repairable part.

Some components, particularly interior parts may have a surface texture or graining Generally this surface finish will not be reflected in a digital record of the die geometry which will generally reflect the die geometry on a more macroscopic scale. The component surface finish may be restored either by adding the surface geometry to the digital record or, if only smooth-faced die portions are available, interposing a second die member with the required texture between the die portion face and the component. Suitably the second die member may be a thin foil so that the entire extent of the die portions may continue to engage the component surface.

Heating may be carried out using any convenient procedure. In general, heating will be confined to the interior portion of the mold portion so that the cooler, unheated portion of the component located at and near the mold portion perimeter may confine and contain the softened or melted material at the repair site. In embodiments, fluid heating, electric resistance heating, dielectric heating and induction heating may be employed. Fluid heating requires passing fluid, heated to a suitable temperature, against the exterior mold surface or that surface opposite the part-contacting surface. The mold portion, particularly if fabricated by additive manufacturing, may readily be adapted to incorporate a hollow passage or passages, to confine and direct the heated fluid. Alternatively, the fluid may be confined with a length of thermally-conductive tubing, suitably-shaped to generally conform to the geometry of the opposing surface, and in thermal communication with the opposing surface. An appropriate level of thermal communication may readily be achieved by brazing or soldering copper-based or aluminum-based tubing to the opposing mold surface. Resistance heating may also be used by suitably attaching a plurality of resistance heating elements, for example cartridge heaters, to the opposing surface of the mold portion and assuring their good thermal communication with the weld portion.

Induction heating may also be used with metal mold portions. A suitably-shaped coil spaced apart from the metal mold portion and electrically excited by high frequency alternating current, say at frequencies of between 5 and 100 kHz will induce eddy currents in the opposing surface of the mold portion resulting in heating due to resistive losses. By suitably matching the frequency of the alternating current with the thickness of the mold portions heat may be generated though the thickness of the mold portion reducing the need for a highly thermally conductive mold portion to facilitate heat transfer from the opposing side to the component-contacting surface of the mold portion.

Dielectric heating may also be employed. Dielectric heating is a process in which a nominally electrically-insulating dielectric material is immersed in a high-frequency electrostatic field. The rapidly-varying field induces molecular dipole rotation causing internal heating in the material due to its own dielectric losses. Typically the material to be heated is placed between two electrodes (which act as capacitor plates) so that the material forms the dielectric component of a capacitor. Commonly a high-voltage source operating at between about 10 MHz and 10,000 MHz (megahertz) powers the electrodes and induces heating in the dielectric. When metal die portions are used they can also serve as the capacitor plates but heating will occur over the entire volume of the component contacted by the die portions. This will reduce or possibly eliminate the constraint imposed by the undamaged portion of the component surrounding the damaged region and in contact with the peripheral regions of the die portions which are unheated in other embodiments. Alternatively, if non-metallic die portions are employed, the high frequency source may be connected to a second, dedicated set of metal electrode plates. The magnet-supporting plates, discussed further below, may also be candidate electrode plates, particularly if of more limited extent than the die portions.

As noted previously it is preferred to maintain a preselected pressure of between about 7 and 700 kPa on the die portions during the reflow or melting process. Depending on the specific thermoplastic, the local component geometry and thickness in the damaged area and the extensiveness of the damage, the force required to develop such a pressure may vary by at least the 100:1 pressure range. The pressure may be applied by two pressure pads comprising magnetic elements arranged to magnetically attract one another and so develop the required pressure. The magnetic elements may be magnets or electromagnets, or one of the elements may be ferromagnetic body. The ferromagnetic body may be a die portion or a separate component. The pressure pads may be located outboard of the die portions so that the die portions are positioned between the magnetic entities and the component. Compared to clamps or other such purely mechanical approaches, this magnetic approach facilitates access to the unexposed surface of the component since attraction is exerted directly between the opposing magnetic entities, and no external mechanical support such as clamps or posts need be provided.

If permanent magnets are used, developing variable force may necessitate adding and removing magnets as required, an approach which will generally admit of only discrete changes in magnetic force. A more flexible and controllable technique is to use electromagnets. Then, through modeling or experimentation, the required force may be preselected by selection of the current passed through the electromagnets. For maximum flexibility the electromagnets may be mounted on a rack and readily reconfigurable and/or the currents passed through each electromagnet, or, more likely, through selected groups of electromagnets, may be adjusted to achieve a desired magnetic field.

For ease of operation it may be preferred to employ electromagnets on only one side, generally the more accessible side, and to locate the more compact and maneuverable ferromagnetic body on the less accessible side. For ease of handling, it may be convenient to fabricate the die portions for easy, temporary, attachment of the magnet frame or ferromagnetic body to the mold portion. For example the mold body, on its opposing surface may accommodate a pocket with threaded bolt holes so that it may receive the magnetic pressure pad and removably secure it with bolts.

Other objects and advantages of the invention will be apparent from a description of preferred embodiments which follows in this specification.

DESCRIPTION OF PREFERRED EMBODIMENTS

The following description of the embodiment(s) is merely exemplary in nature and is not intended to limit the invention, its application, or uses.

One 'lightweighting' strategy employed by vehicle manufacturers is to replace mass-intensive sheet steel components with lighter weight polymer components, commonly higher strength, fiber reinforced polymer components.

Initially most such polymer-based components were manufactured of thermosetting polymers, or thermosets, but, increasingly, thermoplastic polymers, or thermoplastics are being used.

An advantage enjoyed by thermoplastics over thermosets is that thermoplastics, once formed, may be re-heated to about their melting point, softened and remelted and then reshaped by application of pressure. Provided the reheating temperature is controlled and limited to only modestly exceeding the polymer melting point, such reshaping may be performed without appreciably degrading the properties of the polymer. This characteristic provides opportunity for repair of thermoplastics since mechanical damage such shear bands, crazing and cracks may be healed by application of pressure to a thermoplastic component heated to about its melting point. Even holes may be repaired in a similar way provided a suitable volume of 'make-up' material is provided to replace the material ejected from the component in forming the hole.

Most polymers contain inert 'fillers', often low cost materials in powder form such as calcium carbonate, silica and clay whose primary purpose is to lower component cost. Where electrical conductivity is required, conductive materials, such as aluminum powders, carbon fiber and graphite may be added. Where increased strength is required, reinforcements, such as boron fibers, carbon fibers, glass fibers and para-aramid fibers may be incorporated into the thermoplastic. Many engineering thermoplastics, that is, those thermoplastic components intended to serve a structural role, will incorporate both fillers and reinforcements.

These filler and/or fiber containing thermoplastics may exhibit additional thermoplastic damage mechanisms such as filler and reinforcement debonding. Melting and re-shaping a damaged filler/fiber containing thermoplastic as described above will be effective in restoring the properties of the thermoplastic matrix but cannot remedy any permanent damage to the reinforcement, for example fiber fracture. Thus, in repaired fiber reinforced composites containing broken fibers, the fiber contribution to strength at the damage zone will be reduced even though the polymer properties may be restored. Weakening due to fiber damage may be greatest for long fiber reinforcements, becoming less important when short chopped fibers are used.

If material has been lost, as for example where a collision has permanently detached material from the component, leaving behind a hole, supplementary material may be added prior to closing the die portions. The supplementary material may be unconsolidated, and in the form of pellets, granules or other convenient form or consolidated into generally planar patches. Granules or pellets may readily be applied to even irregular holes, but, if a patch is used, it may be advantageous to cut out the hole to a predetermined size so that a patch of that same predetermined size may be used. Generally the composition, filler and fiber content of the additive material will substantially match that of the component but, if appropriate, the additive material may comprise alternate fillers or fibers or fillers and fibers in differing concentrations. Additive material may be provided even if a hole is not created. For example, where fiber breakage is of concern it may be desired to locally supplement the fiber content by applying a thin, fiber-rich patch at the damage zone so that additional fibers may be incorporated into the repaired portion.

While the ability to repair thermoplastic components by application of heat and pressure makes them attractive substitutes for thermosets, the utility of this capability is depreciated if components must be disassembled and removed from a vehicle, machine or device to enable repair. Most vehicle components are formed in a shaped mold into complex forms, and it is desired that a repaired component, particularly a repaired component, visible to a vehicle driver or passenger, should exhibit a shape and texture substantially indistinguishable from that of the original component. Heretofore this would have required that a component be removed from the vehicle and reshaped in its original mold. However, as illustrated in the following example, Applicants have developed a procedure which enables in-place repair using custom mold portions.

Figure 1:
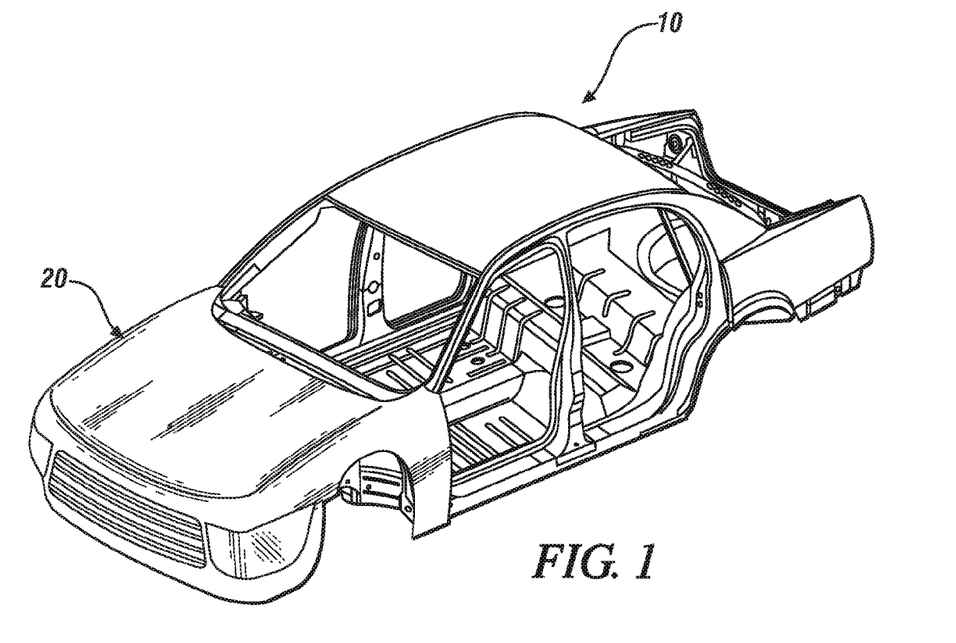
FIG. 1 shows a perspective view of a thermoplastic vehicle hood, incorporating other components, mounted on a vehicle body structure, a 'body-in-white', prior to the additions of doors, trunklid and other 'hang-on' parts.

In FIG. 1, an exemplary thermoplastic component, a vehicle hood outer panel 20, is illustrated in car position and attached to vehicle body 10. It will be appreciated that vehicle body 10 is a body-in-white, that is, the assembled vehicle body structure which supports additional 'hang-on' or 'bolt-on' parts such as the doors and decklid (not shown) in addition to the hood 20.

Figure 2:
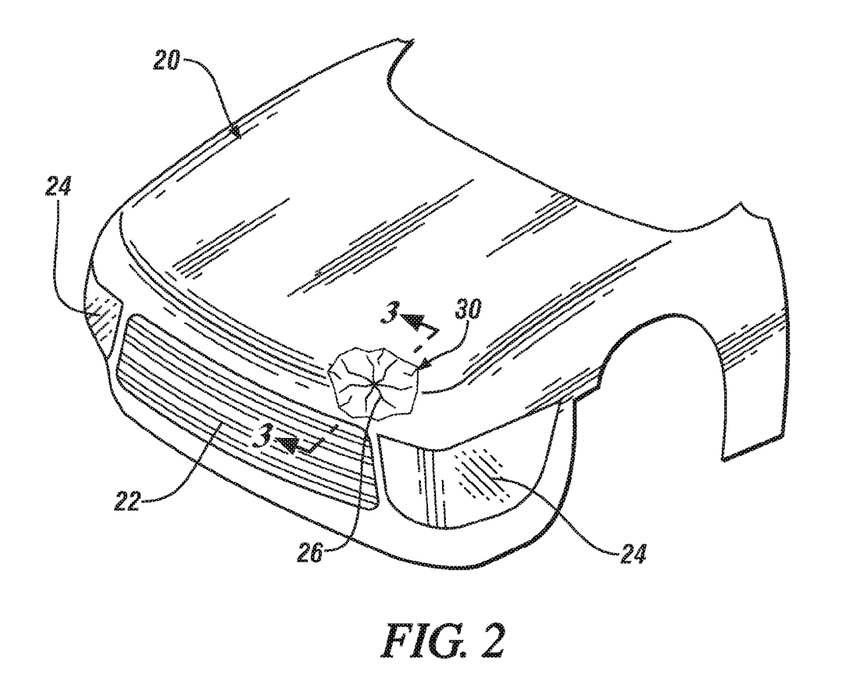
FIG. 2 is an enlarged, perspective view of the hood shown in FIG. 1 illustrating a region of local damage, possibly resulting from impact which has introduced cracks and staved in portion in the damaged region.

In FIG. 2, hood outer panel 20, here shown as an integrated module incorporating lights 24 and grille 22, is shown in isolation. Hood outer panel 20, as shown, has experienced damage on the driver's side at zone 30 which has introduced cracks 26 and resulted in the staving in of zone 30 (best seen at FIG. 3 and succeeding figures). Such damage is intended to be illustrative and not limiting, but may arise, for example, by under-running an angled horizontal obstacle, such as a fence rail, set at about hood height. As shown in the sectional view of FIG. 3 and succeeding figures, the damage shown in FIG. 2, and similar damage occurring in other components may be repaired by practice of this invention. An advantage of this invention is that such damage may be repaired with the panel in-place, provided only that suitable access to both opposing hood surfaces is available with the hood open and suitably supported. Of course, these repair practices also apply if removal of the damaged component is required prior to repair.

Figure 3:
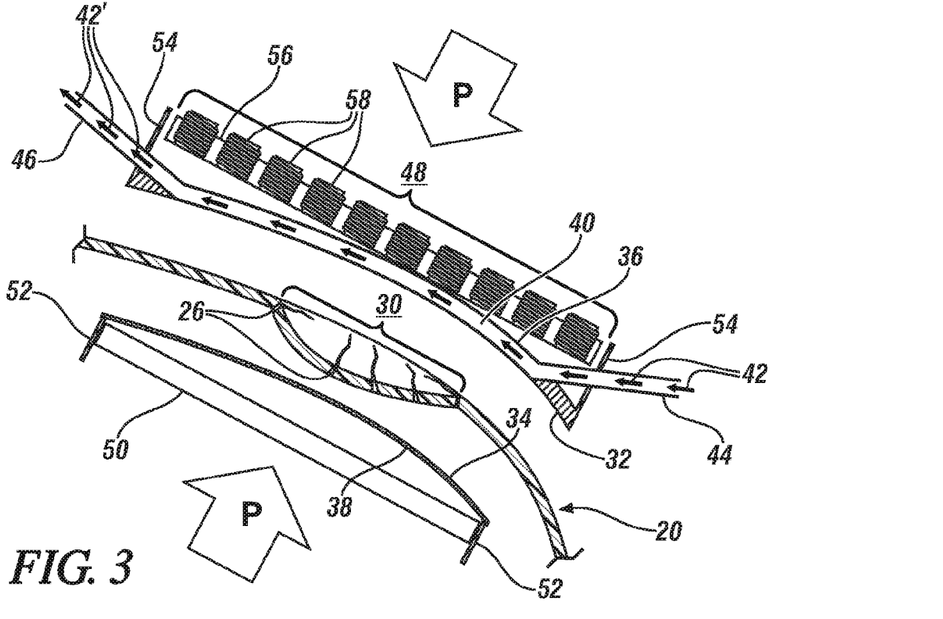
FIG. 3 is a fragmentary cross-sectional view of the damaged region shown in FIG. 2 immediately prior to repair. A pair of opposed die portions with a magnetic system for attracting the die portions together and into engagement with the damage area is shown in an open position, that is, before engagement with the component. One die portion incorporates a hollow volume with an inlet and outlet suited for circulation of heated fluid to enable heating of the die portion. The heated die portion, when in contact with the thermoplastic, heats the thermoplastic.

In the embodiment of the invention shown at FIG. 3, staved-in damage zone 30 with cracks 26, and some portion of the region surrounding the damaged zone, is positioned between two complementary part-contacting faces 32, 34 of die portions 36, 38 shown in an open position. Die portion 36 is hollow with an internal fluid flow channel 40 extending part-way across the die portion. Flow channel 40 receives heated fluid 42 at inlet 44 and discharges cooled fluid 42' at outlet 46. In traversing flow channel 40, the heated fluid gives up heat to die portion 36 which, when the die portions are in their closed position and in full contact with hood 20 and damage zone 30 with cracks 26, conveys heat to hood 20 and damaged zone 30. Die portions 36 and 38 may be brought to their closed position through attractive forces generated by magnetic interaction.

An electromagnet array 48, comprising a plurality of electromagnets 58 mounted in a frame 56 is placed on one side of the damaged component. A ferromagnetic body 50 is mounted on the opposing side of the damaged component. Generally, for reasons of access. the bulkier electromagnet array 48 with its associated power cables (not shown) will be mounted on the exterior, or more accessible side of the component, while the more compact and maneuverable ferromagnetic body is positioned on the interior, or less accessible side of the component. This arrangement however is not limiting and may be reversed if appropriate. It may be convenient to provide a cavity on the reverse or non-part contacting surface of the die portions to receive and contain the magnetic array and/or the ferromagnetic body. The bounding walls of such a cavity are shown as 52 on die portion 38 and 54 on die portion 36.

Figure 4A:
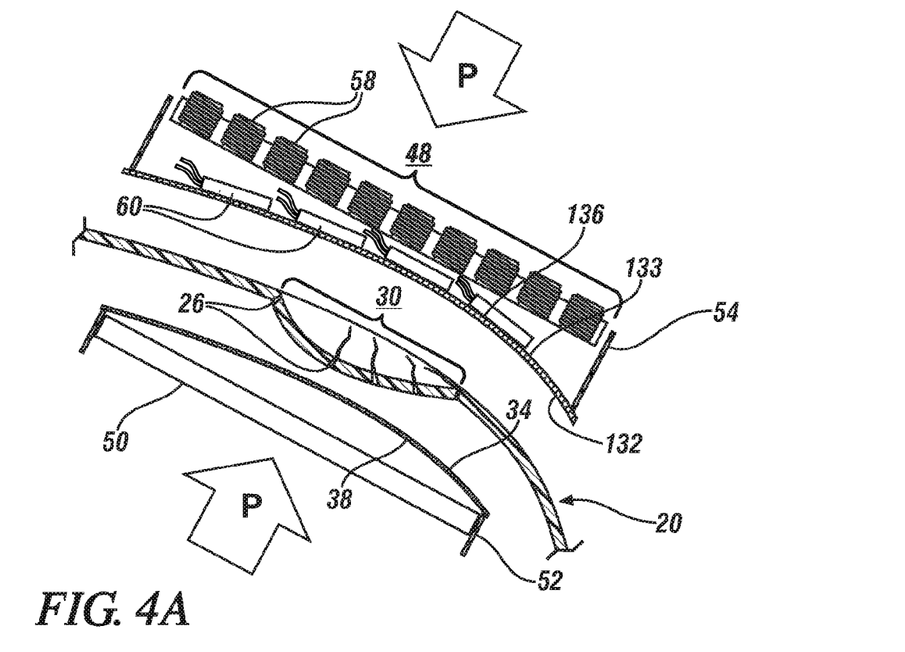
FIG. 4A is a fragmentary cross-sectional view of the damaged region shown in FIG. 2 immediately prior to repair and shows similar die portions and a similar magnetic system in their open position, analogous to FIG. 3. In this embodiment, heating of the die portion is performed by electric heaters placed on the opposing surface of a mold portion. The heated die portion, when in contact with the thermoplastic, heats the thermoplastic.

A second embodiment is shown at FIG. 4A. Again magnetic array 48 is pocketed in a die portion, here die portion 136 with part-contacting surface 132, and positioned on one side of hood 20 and encompassing damaged zone 30. Opposing die portion 38 and its associated pocketed ferromagnetic body 50 are again positioned on the opposing side of hood 20 and encompass the damaged zone 30. A plurality of electric heating elements, here illustrated, without limitation, as generally cylindrical cartridge heaters 60, are positioned on, and in thermal communication with, the non-part contacting surface 133 of die portion 136.

Figure 4B:
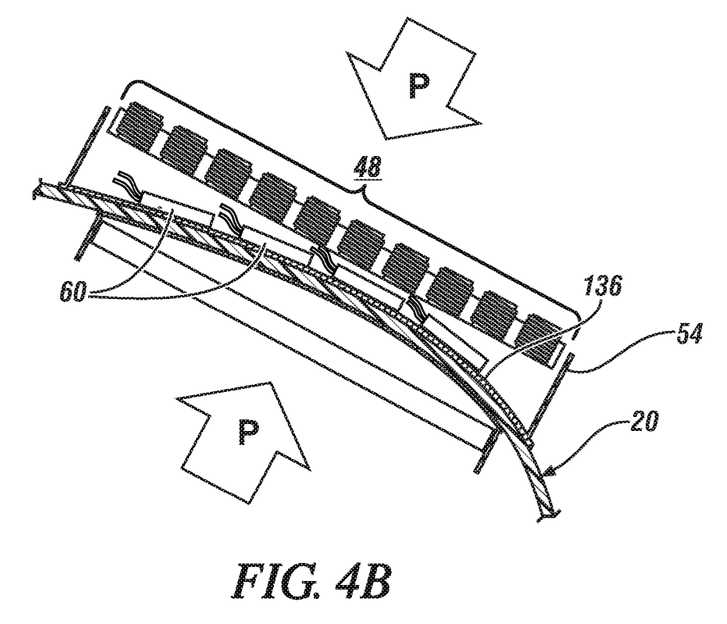
FIG. 4B shows the same region with the mold portions in a closed position after a successful repair and immediately prior to removal of the mold portions.

In application of the method, damaged region 30 may first be cleaned. The major requirement is that no oils or similar hydrocarbons are present which would inhibit healing of cracks or similar damage. Generally washing with a water-based cleaner followed by a water rinse will be adequate. Beneficially, small quantities of dust or other fine particulates may be simply incorporated into the damage region and serve as filler. Once damage zone 30 is suitably cleaned and dried, die portion 136, and its associated electromagnetic array 48, may be positioned over, and on one side of, damaged region 30. Die portion 38, and its associated ferromagnetic body 50, is positioned over and on the opposing side of damage region 30. Power is supplied to the electromagnets of electromagnetic array 48, inducing a magnetic field which serves to attract ferromagnetic block 50. The number of participating electromagnets and the current applied to them is selected to generate sufficient attractive force between electromagnetic array 48 and ferromagnetic body 50 to enable die portion surfaces 132 and 34 to apply a pressure P to component 20 and damaged region 30. Passage of current through cartridge heaters 60 will raise their temperature and so heat, by conduction, first die portion 136 and then hood component 20 and damaged region 30. When the component temperature attains a temperature of about the melting point of the thermoplastic, the thermoplastic will reflow and heal any defects in the damaged portion, restoring hood 20 to its original undamaged state as illustrated in FIG. 4B. Discontinuing heating by terminating current flow to heaters 60 will enable hood 20 and die portions 136 and 38 to cool so that the softened/melted thermoplastic may harden/solidify. Once hardening/solidification occurs power to electromagnetic array 48 may be terminated enabling removal of the die portions so that now-repaired hood 20 may be returned to service.

It is preferred to at least monitor the die portion temperature to assure that it falls within a range appropriate to the melting temperature of the thermoplastic under repair. Most simply, this may be done by monitoring the temperature of a representative location on the die portion and appropriately adjusting the current supplied to the heaters to maintain the monitored temperature in a suitable range. Monitoring may be performed visually using temperature sensitive paints and coatings, or, electrically using, for example, thermocouples or thermistors. Appropriate adjustment of die portion temperature may be effected manually, by an operator, or automatically, by a dedicated or general purpose electronic controller.

A similar practice may be followed using the hot fluid heating method shown in FIG. 3. In this embodiment the die portion temperature may be conveniently controlled by control of the heating fluid temperature. Typically the heated fluid, which may be a glycol or a silicone oil, will be recirculated so that the fluid 42' exiting the die portion 36 at outlet 46 will pass through a heater and, optionally, to a reservoir, and then be re-introduced to die portion 36 at inlet 44 as heated fluid 42. Such an approach is expected to enable more even heating of the die portion and may more readily lend itself to electronic control.

Figure 5:
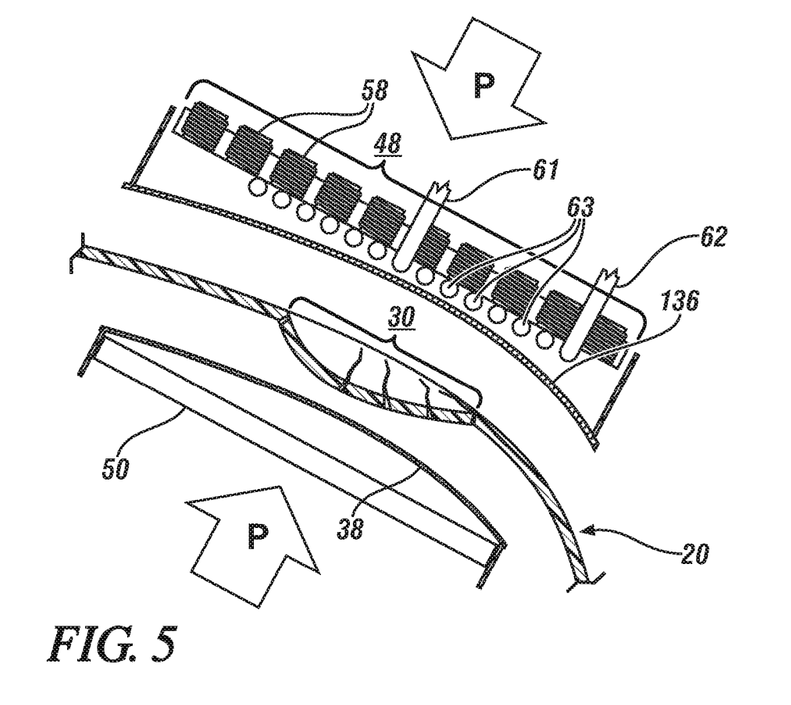
FIG. 5 is a fragmentary cross-sectional view of the damaged region shown in FIG. 2 immediately prior to repair and shows similar die portions and a similar magnetic system in their open position, analogous to FIG. 3. In this embodiment, heating of the die portion is performed by induction heating. The heated die portion, when in contact with the thermoplastic, heats the thermoplastic.
Figure 6:
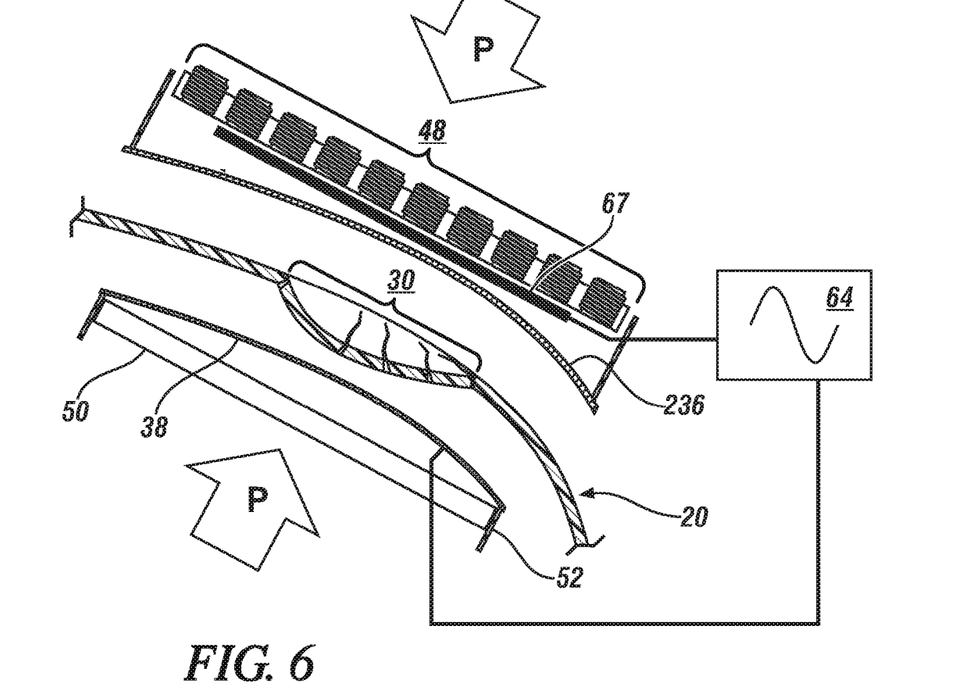
FIG. 6 is a fragmentary cross-sectional view of the damaged region shown in FIG. 2 immediately prior to repair and shows similar die portions and a similar magnetic system in their open position, analogous to FIG. 3. In this embodiment, direct heating of the thermoplastic is performed by dielectric heating.

Two further embodiments employing alternate heating methods are shown in FIGS. 5 and 6. In FIG. 5 a pancake-shaped induction coil suited for induction heating and comprising a coil loops 63 and connectors 62 and 61 is located between electromagnetic array 48 and die portion 136. Commonly such coils and connectors may be fabricated of small diameter copper tubing so that cooling water (not shown) may be circulated through the coil during operation. So, for example, connector 61 may also serve as the water inlet and connector 62 as the water outlet or vice versa. When coil 62 is excited by passage of electric current at a frequency of between 10 kHz and 100 kHz or so induced by a generator (not shown), the rapidly-changing magnetic fields created will induce eddy currents, and resistive heating, in at least die portion 136. Again, the heat arising in die portion 136 is transferred to at least damage zone 30 to enable repair of hood 20. Finally, as shown in FIG. 6, dielectric heating may be employed. In this approach, high frequency, between about 10 MHz and 10,000 MHz (megahertz), electric current is applied by generator 64 to capacitor plate 67 and die portion 38, here also serving as a second capacitor plate. In some implementations, discussed further below, both die portions may serve as the capacitor plates. In this embodiment, die portion 236 must be non-metallic, for example fabricated from ceramic. The rapidly-changing electrical field in the electrically insulating thermoplastic sandwiched between the capacitor plate die portions results in energy dissipation by dielectric loss as the molecules attempt to line up with the continuously changing electric field.

When either induction heating or dielectric heating are employed it may be appropriate to shield some portions of the set-up to ensure that heating is confined to the polymer.

As shown most clearly in FIGS. 3 and 4 it is preferred that the heated region of the die portion should encompass the damaged zone 30 but not extend to the die portion boundary. Due to the softening and/or melting occasioned by heating the pressure applied to the die portions might if applied to a uniformly softened or melted region expel some of the liquid, squeezing it out from between the die portions and depositing it beyond the die portion boundaries. This would both mar the component surface and weaken the repaired component at the repair location. Thus, it is preferred to heat only the visibly damaged zone and, to assure that no unobservable damage is left unrepaired, a small band of material immediately adjacent to the damaged zone. Extending the die portions beyond the heated region ensures that the periphery of the die portion is supported on cooler thermoplastic which will not appreciably deform. These cooler regions will both maintain a component-appropriate spacing between the die portion part-contacting surfaces, and act as a barrier to expulsion so that the component dimensions may be maintained in the repaired zone.

Localizing the heating to only the interior region of the die portion may be readily accomplished when fluid heating or heating by electric resistance using discrete heating elements are employed since the heating zone may be defined by the heating element or circulation path placement. For induction heating using the flat 'pancake' coil shown the heat may be directed by coil design generally and by its diameter particularly. Localizing dielectric heating, particularly if the die portions are to serve as the capacitor plates, may be more challenging. It will be appreciated that even though plate 67 (FIG. 6) may be of lesser extent than die portion 38, fringing fields may still produce appreciable heating at the periphery of die portion 38. One approach to establishing a suitable temperature gradient across the die portion faces and applicable to all heating approaches, is to circulate cooling water around the die periphery. A second approach, specific to dielectric heating, is to fabricate electrically non-conductive die portions of say, ceramic, and deposit a metal layer only on the interior of the non-part contacting surface. The metal layers would then serve as the capacitor plates and appropriate sizing and placement of the metal layers would enable heating only in the interior region of the die portion.

Because only a relatively low pressure may be applied the die portions may typically be thin shells. Where necessary these shells may be appropriately reinforced, for example by addition of ribs to impart suitable rigidity and, in some embodiments, as noted above, may be thermally and electrically conductive. Die portions may be produced by machining and polishing an aluminum or steel blank but such conventional processes are not economical for repairs which will typically be handled case-by-case. Thus, in general, the die portions will be fabricated using net shape processes.

Where physical models, such as the original production mold or a suitable surrogate such as an intact part, preferably a part validated against a master data file, are available they can serve as templates for the die shell portions. The physical model may be used to shape and support a take-off which may serve as a mold surface if made from a part. If the take off is made from a mold, it may be used to support a second take-off which will replicate, on its surface, the portion of the die used to manufacture the production part. The die portion may be fabricated of suitably reinforced plaster or polymer or, more preferably metal. A metal die portion may be prepared, from the part or from a take-off, by, for example, using thermal spray coating techniques, but other approaches, such as plating, well known to those skilled in the art, may also be used.

In many cases however, the original mold surfaces will be stored as a digital record which may serve to re-create the required portions by 3D printing or additive manufacturing. Suitable additive manufacturing processes for metal structures include Selective Laser Sintering (SLS) in which powders, which may be metal, ceramic or glass powders, are fused together into a porous body using high powered lasers with beam traversing capability. The part to be manufactured is first represented as a series of stacked layers or slices. Then the laser is scanned, following the geometry of a base slice, across a bed of powder. In the areas traversed by the laser, the powder will be consolidated and fused together into a solid slice. Without disturbing that slice, an additional layer of powder is applied and the process repeated for the next slice, creating a second fused slice which is also fused to the first slice. This sequence is repeated for all of the remaining slices until a fused body corresponding to the shape and dimensions of the original model is manufactured. Suitable metal powders include alloys of copper, iron and titanium among others Higher temperatures, capable of melting and fusing metal and non-metallic powders, may be achieved with electron beam melting (EBM) in which the powder layers are melted to form fully dense, void-free bodies. Non-metallic, for example ceramic- and polymer-based, additively-manufactured mold portions may also be used provided they will remain stable under the applied pressure and molding temperature required of the repairable component. As has been noted, there is some advantage to employing electrically non-conductive materials when dielectric heating is contemplated.

Such additive manufacturing processes admit of relatively straightforward modification of the die portion geometry, particularly on the non part-contacting or opposing surface, which may include pockets or similar retaining structures for the magnet array or for the ferromagnetic body or fluid circulation channels. The proposed changes to the die portion geometry may be made to a CAD (computer aided design) file or other digital record. The new features will modify the geometry of the layers but otherwise pose no manufacturing challenge beyond that presented by a part in the absence of such features. Some components, such as vehicle interior parts, may have surface texture, for example leather graining, which may not be comprehended by the digital record. If necessary, these features, provided they are of greater depth or height than the height resolution capability of the additive manufacturing process, often about 16 micrometers or so, may be added digitally. If more subtle textures are desired, or if it is inconvenient to modify the digital record, a foil or similar thin sheet with the desired texture may be interposed between the mold portion and the damage zone so that the imprint of the foil will transfer to the component.

The magnetic attraction relied upon to apply pressure to the mold portions and through the mold portions to the component is shown in each of FIGS. 3, 4A/B, 5 and 6 as resulting from the attraction generated between an electromagnetic array and a ferromagnetic body. This combination however is only one of many which may be employed. Permanent magnets may be substituted for either the electromagnets or the ferromagnetic body and electromagnets may be applied to each of the die portions rather than only the single die portion as shown. Suitable permanent magnets are preferably of higher magnetic performance rare earth compositions but ferrites, particularly for small damage zones in thinner components, may also be suitable.

Figure 7:
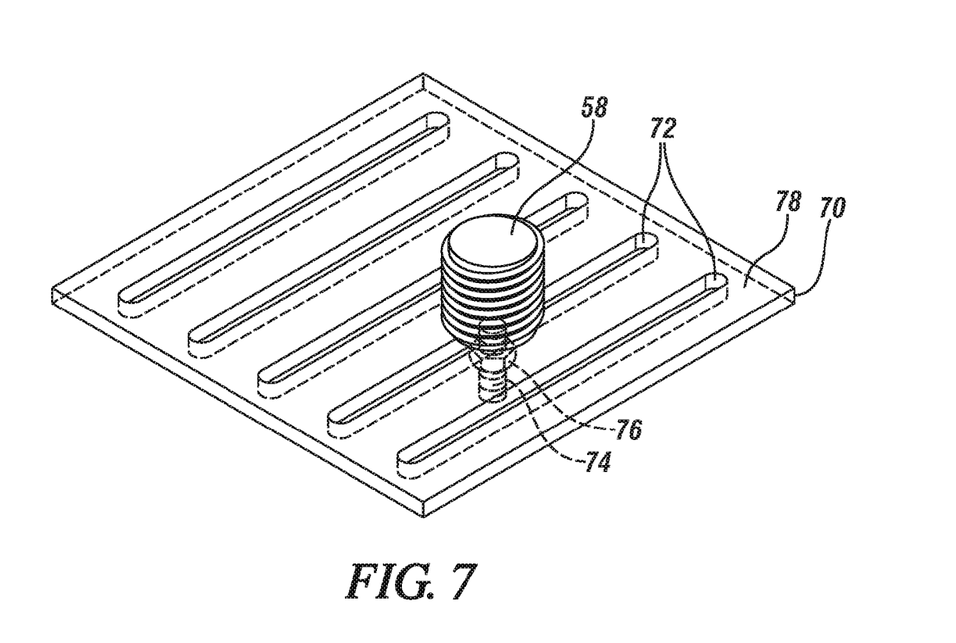
FIG. 7 illustrates a slotted rack adapted for positioning of a plurality of electromagnets to achieve a suitable magnetic flux.

It may be beneficial to mount the electromagnets, or permanent magnets, on a support fixture which enables simple repositioning of the magnets. An example is shown in FIG. 7 and consists of a rack 70 with a plurality of slots 72, here shown as parallel. However, other slot configurations, for example short slots with short perpendicular slotted segments arranged so that in plan view they resemble either the letter 'T' or the letter 'X' may also be used. Electromagnet 58 rests on surface 78 of rack 70 while threaded support 74, attached to electromagnet 58 extends through one of slots 72 and is secured against rack 70 by nut 76. For clarity only one electromagnet has been shown, but it will be appreciated that many more electromagnets may be accommodated by rack 70 and positioned and re-positioned as required. Thus any required magnetic field distribution, for any part to be repaired, may be readily obtained by placing the requisite number of electromagnets in their appropriate positions. Thus a limited number of racks, possibly of varying size, may afford sufficient flexibility to accommodate a multiplicity of repair tasks on a multiplicity of components.

Figure 8:
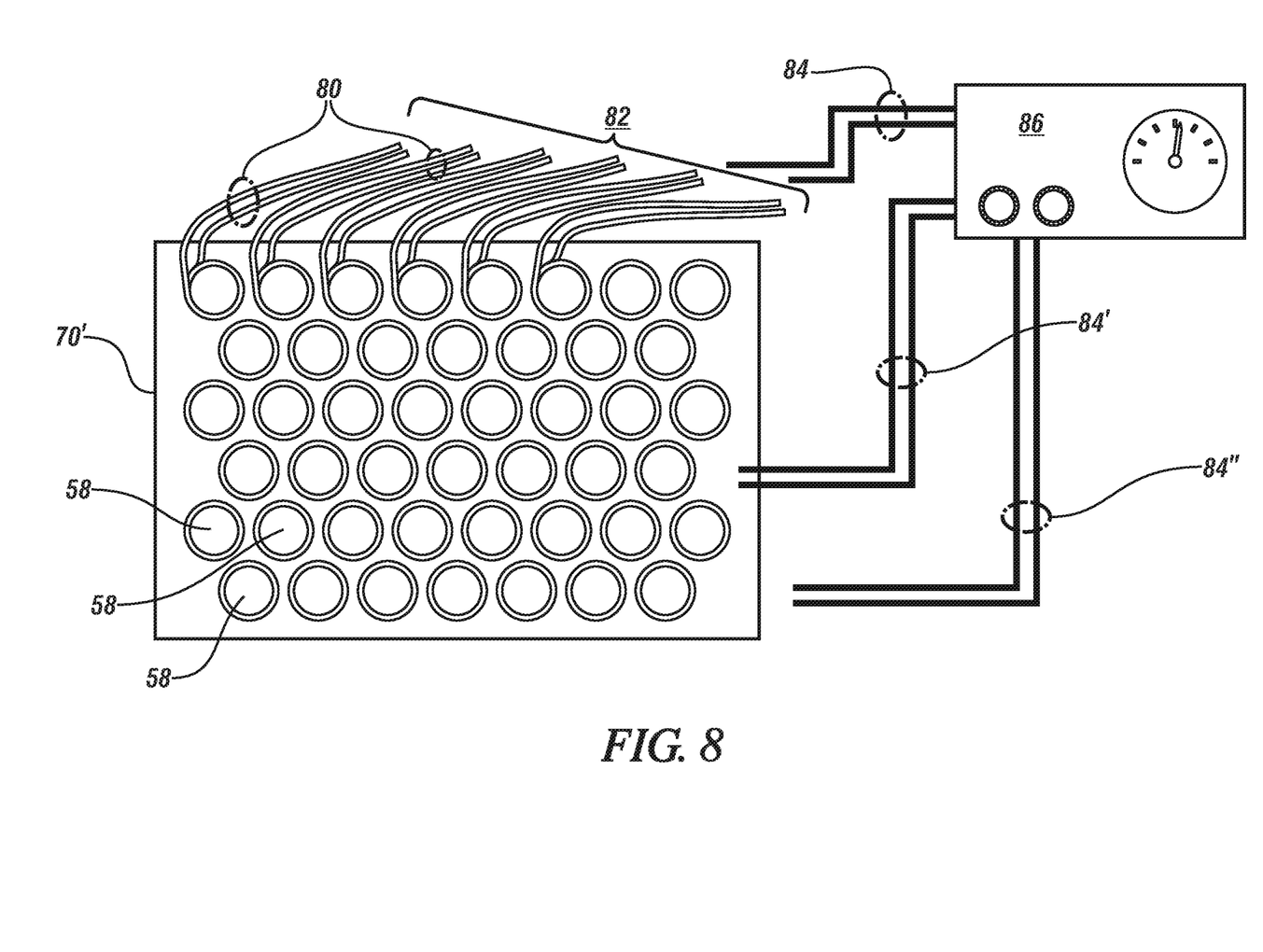
FIG. 8 illustrates a rack adapted for securing a plurality of electromagnets in fixed positions and a power supply/controller adapted to output electromagnet-powering currents, through multiple power lead pairs to the active

An alternative approach to achieving such flexibility is to have a rack comprising a fixed array of electromagnets but electrically activate only those electromagnets required for any particular repair. This is illustrated in FIG. 8 which shows, in plan view, rack 70' with an array of electromagnets 58. Each electromagnet 58 has an associated pair of electrical leads 80, only a few of which are shown for clarity.

Some number of lead pairs 80 may be aggregated into grouping 82 for connection, in series or parallel, as required, with power lead pair 84 issuing from power supply/controller 86. Similar and additional groupings of electrical leads, not shown, associated with the remaining electromagnets 58 may be connected to additional power lead pairs 84' and 84" from power supply/controller 86. Thus, by forming groupings of electromagnets, which may total fewer than the total number of available electromagnets, and suitably powering these groupings with an appropriate power supply/controller, any suitable magnetic field strength may be achieved.

Of course, both approaches to developing a preferred magnetic field strength may be used in combination. Thus the adjustable rack 70 of FIG. 7 and its associated electromagnet mounting features may be powered by power supply/controller 86 of FIG. 8 to provide maximum flexibility in achieving a desired magnetic field strength.

Such racks or ferromagnetic bodies will generally be supported by the die portions. Preferably the die portions may contain features, such as the pockets shown in FIGS. 2-6 to reliably secure the racks. Further features, such as threaded studs or pins (not shown in FIGS. 3-6) for temporarily retaining the racks or ferromagnetic bodies to the die portions may also be incorporated. Preferably such racks, or ferromagnetic bodies, may be fabricated in standardized sizes with features complementary to the retention features of the die portion for rapid assembly and disassembly of the repair apparatus.

While preferred embodiments of the invention have been described and illustrated, these are not intended to limit the scope of the invention.

The invention claimed is:

1. A method of repairing damage, localized in a damage zone, in a shaped thermoplastic sheet component with a thickness, the component having an undamaged shape, the shaped thermoplastic sheet component having opposing surfaces, the damage zone comprising only a portion of the shaped thermoplastic sheet component, the damage zone having an extent and a center, the method comprising:

fabricating opposing die portions, each having forming surfaces complementary in shape to a portion of one of the opposing surfaces of the shaped thermoplastic sheet component in its undamaged shape, the forming surfaces being adapted for centering on the damage zone center, the forming surfaces extending outwardly beyond the extent of the damage zone, the die portions comprising a magnetic system comprising a first and a second magnetic element, the magnetic elements being adapted to develop an attractive magnetic force between the elements, the magnetic elements being so positioned that the magnetic force urges the die portions together;

placing the die portions on the opposing component surfaces and using the magnetic elements to urge the forming surfaces of the die portions into forcible engagement with the surfaces of the component by application of the magnetic force, the force applying sufficient pressure to the component surfaces to reshape the component to substantially its undamaged shape;

selectively heating the reshaped thermoplastic sheet component at the damage zone to a temperature sufficient to soften and/or melt the thermoplastic, the sheet being heated either directly, or by contact with at least one heated die portion, the forming surfaces extending outwardly beyond the extent of the damage zone and being supported on unheated portions of the component to assure that the spacing between the opposing die forming surfaces corresponds to the thickness of the undamaged component at the damage location;

maintaining the heated shaped thermoplastic sheet component damage zone at about its softening/melting temperature for a time sufficient to heal the damage in the damage zone; and, discontinuing heating while maintaining pressure on the component damage zone until the component damage zone cools sufficiently to maintain its shape and thereby restore the damage zone to its original shape and thickness.

2. The method of repairing a damage zone in a shaped thermoplastic sheet component as recited in claim 1 in which the thermoplastic sheet is heated directly by dielectric heating.

3. The method of repairing a damage zone in a shaped thermoplastic sheet component as recited in claim 1 in which the thermoplastic sheet ranges in thickness from 1.5 to 6 millimeters and the thermoplastic sheet is heated by contact with a heated die portion and the die portion is heated by one of the group consisting of fluid heating, electric resistance heating and induction heating.

4. The method of repairing a damage zone in a shaped thermoplastic sheet component as recited in claim 1 in which the thermoplastic is selected from one of the group consisting of polyamides, polyolefins, polyacrylates, polycarbonates, and polyesters, the thermoplastic optionally comprising reinforcing fibers.

5. The method of repairing a damage zone in a shaped thermoplastic sheet component as recited in claim 1 further comprising adding additional thermoplastic material, optionally comprising reinforcing fibers, to the damage zone prior to urging the die portions into engagement with the component surfaces, the additional thermoplastic material being added only in sufficient quantity to replace any portion of the thermoplastic sheet component lost from the damage zone.

6. The method of repairing a damage zone in a shaped thermoplastic sheet component as recited in claim 1 in which the method of fabricating the one or more die portion forming surfaces utilizes a portion of a digital record of one or more corresponding mold surfaces used to initially fabricate the undamaged thermoplastic sheet component, the method comprising:

identifying the center of the damage zone and its extent, identifying the extent of the die portion by linearly scaling the dimensions of the damage zone extent by between about 110% and 150%, extracting, from a digital record of the component mold, data from the one or more mold surfaces corresponding to the extents of the respective one or more die portions, and manufacturing the respective one or more die portion forming surface(s) corresponding to the mold surface(s) using an additive manufacturing process suitable for production of durable objects.

7. The method of repairing a damage zone in a shaped thermoplastic sheet component as recited in claim 6 in which the method of fabricating the die portion further comprises:

identifying a suitable magnetic system, and modifying the additive manufacturing process so that the die portion includes, on a die portion surface which does not contact the part, one or more features for retention of one of the magnetic elements.

8. The method of repairing a damage zone in a shaped thermoplastic sheet component as recited in claim 1 in which thermoplastic sheet component has a textured surface and the die portion comprises a like-textured component-contacting surface.

9. The method of repairing a damage zone in a shaped thermoplastic sheet component as recited in claim 1 in which the thermoplastic sheet component has a textured surface, the method further comprising interposing a thin foil or sheet with a like-textured surface between the die portion and the component surface such that the like-textured foil or sheet surface is the component-contacting surface.

10. The method of repairing a damage zone in a shaped thermoplastic sheet component as recited in claim 1 in which the magnetic system comprises an electromagnet or a permanent magnet as the first element and an electromagnet, permanent magnet or ferromagnetic body as the second element.

11. The method of repairing a damage zone in a shaped thermoplastic sheet component as recited in claim 10 in which the ferromagnetic body which comprises the second magnetic element is a die portion.

12. The method of repairing a damage zone in a shaped thermoplastic sheet component as recited in claim 1 in which the magnetic element comprising an electromagnet comprises a plurality of electromagnets attached to a frame support, the frame and electromagnets being adapted to enable repositioning of the electromagnets so that the magnetic element may be reconfigured.

13. The method of repairing a damage zone in a shaped thermoplastic sheet component as recited in claim 1 in which the attractive magnetic force generates a pressure of between about 7 kPa and 700 kPa on the opposing component surfaces.

14. The method of repairing a damage zone in a shaped thermoplastic sheet component as recited in claim 5 in which the reinforcing fibers consist of one or more of boron fibers, carbon fibers, fibrous minerals, glass fibers and para-aramid fibers.

15. An in-place method of repairing damage, localized in a damage zone, in a shaped thermoplastic sheet component with a thickness while the shaped thermoplastic sheet component is assembled into an article of manufacture and attached to other components for cooperative interaction with the other components, the shaped thermoplastic sheet component having an undamaged shape, the shaped thermoplastic sheet component having opposing surfaces, the damage zone comprising only a portion of the component, the damage zone having an extent and a center, the method comprising:

fabricating durable opposing die portions with forming surfaces, each forming surface being complementary in shape to a portion of one of the opposing surfaces of the undamaged shaped thermoplastic sheet component, the forming surfaces being centered on the damage zone center and extending outwardly beyond the extent of the damage zone, the die portions comprising a magnetic system comprising first and second magnetic elements adapted to develop an attractive magnetic force between the elements, the elements being positioned so that the magnetic force urges the die portions together;

aligning the forming surface of each die portion with its complementary component surface portion in the damage zone, and, optionally, after preheating the damage zone;

urging each of the die portions into forcible engagement with one of the opposing shaped thermoplastic sheet component surfaces by application of the magnetic force, the force applying pressure to the component surfaces sufficient to reshape the component to substantially its undamaged shape; then, selectively heating the reshaped thermoplastic sheet component at the damage zone to a temperature sufficient to soften and/or melt the thermoplastic, the sheet being heated either directly or by contact with at least one heated die portion, the forming surfaces extending outwardly beyond the extent of the damage zone and being supported on unheated portions of the component to assure that the spacing between the opposing die forming surfaces corresponds to the thickness of the undamaged component at the damage location;

maintaining the heated shaped thermoplastic sheet component damage zone at about its softening/melting temperature for a time sufficient to heal the damage in the damage zone;

cooling the shaped thermoplastic sheet component damage zone while maintaining pressure on the component damage zone until the component damage zone cools sufficiently to maintain its shape and thereby restore the damage zone to its original shape and thickness, then, discontinuing the application of magnetic force; and removing the magnetic system and die portions.

16. The in-place method of repairing a damage zone in a shaped thermoplastic sheet component as recited in claim 15 in which the thermoplastic sheet is heated directly by dielectric heating.

17. The in-place method of repairing a damage zone in a shaped thermoplastic sheet component as recited in claim 15 in which the thermoplastic sheet is heated by contact with a heated die portion and the die portion is heated by one of the group consisting of fluid heating, electric resistance heating and induction heating.

18. The in-place method of repairing a damage zone in a shaped thermoplastic sheet component as recited in claim 15 in which the thermoplastic sheet component has at least one textured surface and the die portion intended for contact with the textured surface comprises a like-textured component-contacting surface.

19. The method of repairing a damage zone in a shaped thermoplastic sheet component as recited in claim 15 in which the method of fabricating the one or more die portion forming surfaces utilizes a portion of a digital record of one or more corresponding mold surfaces used to initially fabricate the undamaged thermoplastic sheet component, the method comprising:

identifying the center of the damage zone and its extent, identifying the extent of the die portion by linearly scaling the dimensions of the damage zone extent by between about 110% and 150%, extracting, from a digital record of the component mold, data from the one or more mold surfaces corresponding to the extents of the respective one or more die portions, and manufacturing the respective one or more die portion forming surface(s) corresponding to the mold surface(s) using an additive manufacturing process suitable for production of durable objects.

20. The in-place method of repairing a damage zone in a shaped thermoplastic sheet component as recited in claim 15 in which the magnetic system comprises an electromagnet or a permanent magnet as the first element and an electromagnet, permanent magnet or ferromagnetic body as the second element.

* * * * *